United States Patent [19]

Williams

[11] Patent Number: 5,184,971
[45] Date of Patent: Feb. 9, 1993

[54] TOY TELEPHONE RECORDER WITH PICTURE ACTUATED RECORDING AND PLAYBACK

[76] Inventor: Susan A. Williams, 120 N. Riverside Dr., Edgewater, Fla. 32132

[21] Appl. No.: 666,707

[22] Filed: Mar. 8, 1991

[51] Int. Cl.⁵ .................. A63H 33/30; A63H 3/28; H04M 1/64; G09F 3/00
[52] U.S. Cl. .................................... 446/142; 446/143; 446/302; 446/404; 365/52; 40/337; 379/88
[58] Field of Search ............... 446/142, 141, 143, 297, 446/299, 302, 404, 484, 485; 365/45, 52; 40/336, 337, 338, 339; 379/88, 52, 51, 199

[56] References Cited

U.S. PATENT DOCUMENTS

| 1,896,352 | 2/1933 | Fiveash ................................ 40/337 |
| 2,806,322 | 7/1954 | Ford . |
| 3,422,566 | 3/1965 | Wolf . |
| 3,587,178 | 6/1971 | Kojima ............................. 446/143 X |
| 3,725,907 | 4/1973 | Boulanger . |
| 3,769,744 | 11/1973 | Sloane, Jr. et al. ................ 446/142 |
| 4,103,452 | 8/1978 | Wood ................................ 446/142 |
| 4,451,911 | 5/1984 | Klose et al. ..................... 446/484 X |
| 4,505,358 | 3/1985 | Sielaff . |
| 4,703,498 | 10/1987 | Bond . |
| 4,713,035 | 12/1987 | Thom . |
| 4,866,764 | 9/1989 | Barker, III ........................ 40/337 X |
| 4,878,871 | 11/1989 | Noto ................................ 446/297 X |
| 4,890,259 | 12/1989 | Simko ................................... 365/45 |
| 4,908,845 | 3/1990 | Little ..................................... 379/51 |
| 5,029,198 | 7/1991 | Walpole et al. .................. 379/52 X |
| 5,031,205 | 7/1991 | Phillips .......................... 379/199 X |

FOREIGN PATENT DOCUMENTS

| 2243740 | 9/1972 | Fed. Rep. of Germany ...... 446/142 |
| 3710135 | 10/1988 | Fed. Rep. of Germany ...... 446/142 |
| 2591501 | 6/1987 | France ................................. 446/302 |
| 2225665 | 6/1990 | United Kingdom ................ 446/142 |

Primary Examiner—D. Neal Muir

[57] ABSTRACT

This invention is a toy audio recorder in the exterior shape of a telephone. The recorder is equipped with large pushbutton assemblies capable of housing illustrations. Depressing one of the pushbutton assemblies will playback the message stored in the storage location associated with that pushbutton assembly, or, if the record switch is depressed simultaneously, a new message will be recorded in that storage location. Messages may be recorded directly or via telephone by using a conventional telephone in concert with the toy telephone recorder.

15 Claims, 4 Drawing Sheets

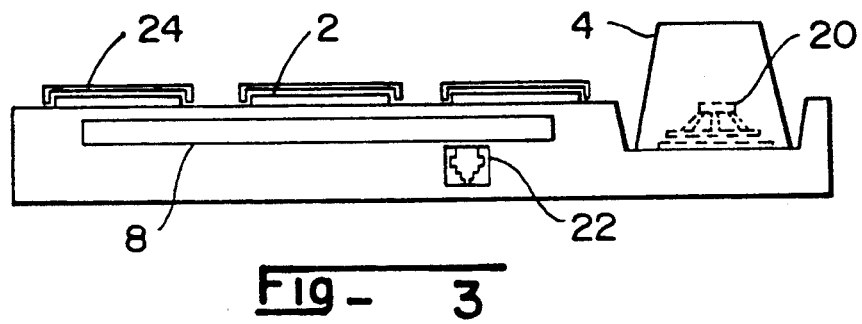
Fig- 3
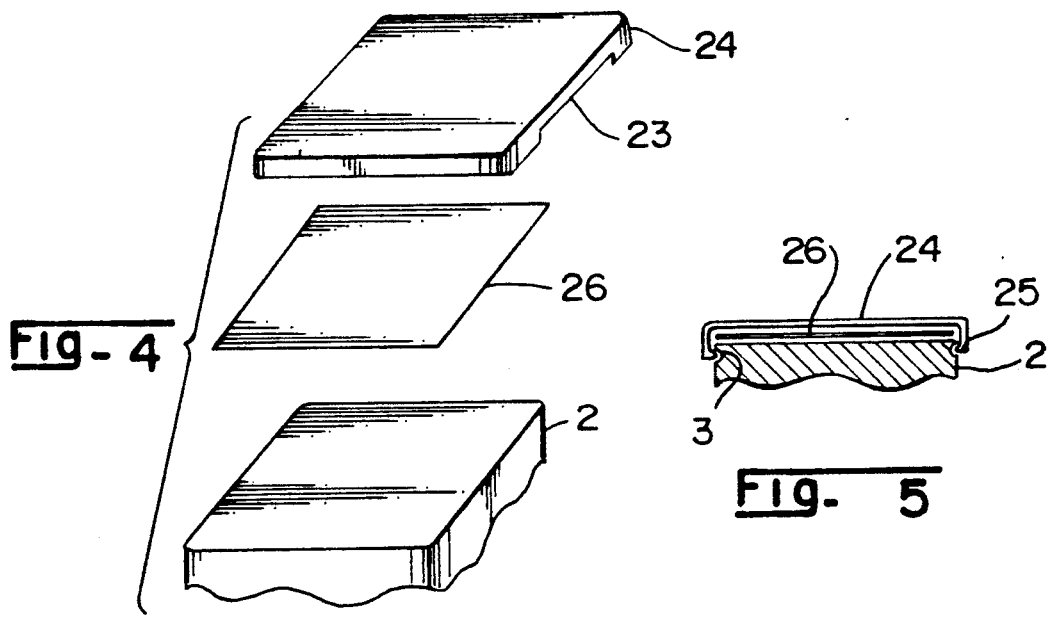
Fig- 4
Fig- 5

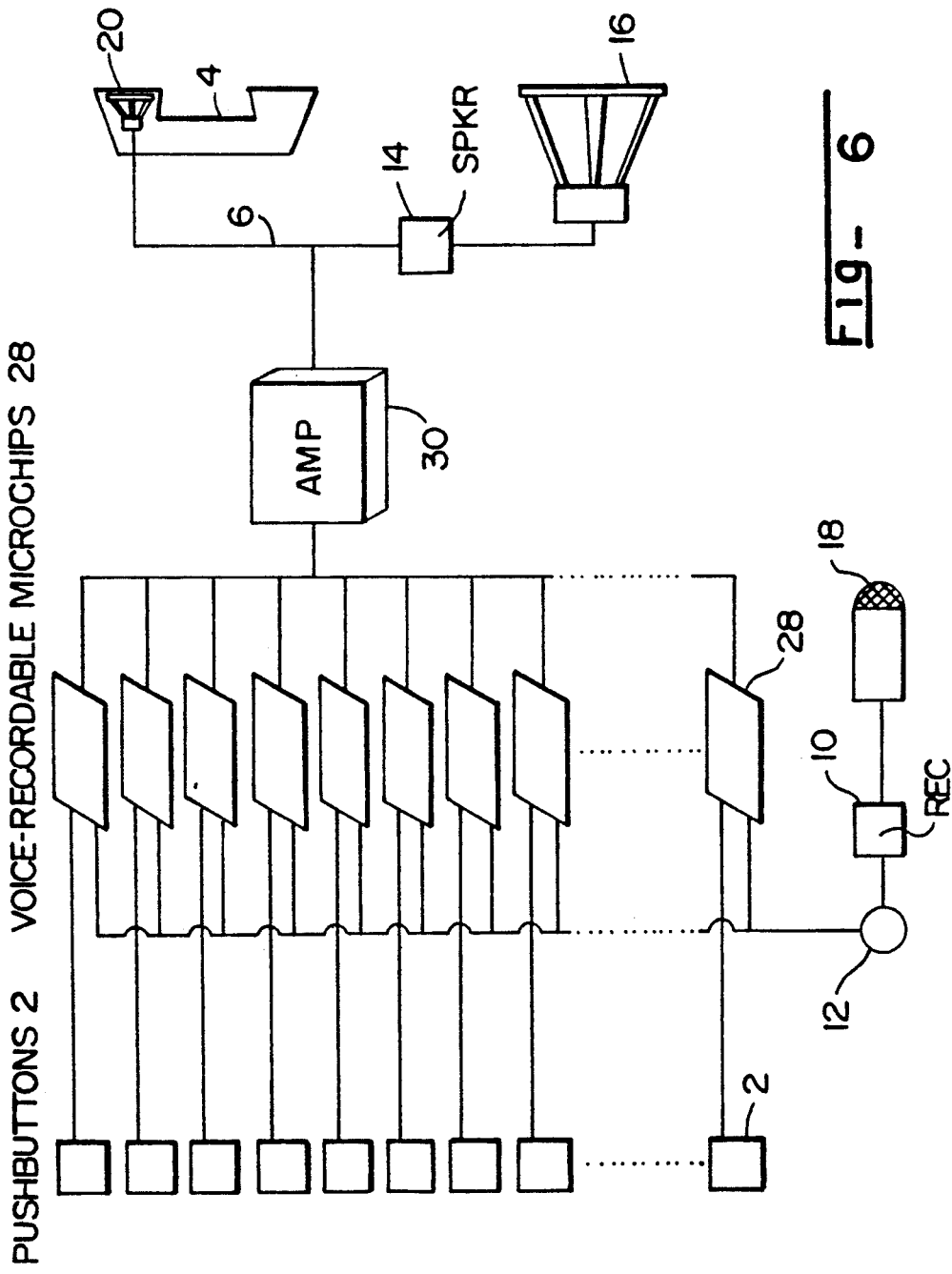

TOY TELEPHONE RECORDER WITH PICTURE ACTUATED RECORDING AND PLAYBACK

CROSS REFERENCE TO RELATED APPLICATIONS

U.S. Pat. No. 4,713,035, Thom, Toy Telephone
U.S. Pat. No. 4,505,358, Sielaff, Voice Communicator
U.S. Pat. No. 3,422,566, Wolf, Miniature Ringing and Talking Telephone
U.S. Pat. No. 2,806,322, Ford, Knockdown Toy Telephone

STATEMENTS AS TO RIGHTS TO INVENTIONS MADE UNDER FEDERALLY SPONSORED RESEARCH AND DEVELOPMENT

No such rights exist.

BACKGROUND OF THE INVENTION

1. Field of the Invention

This invention relates to toy telephones, and more specifically to a toy telephone capable of recording and playing back messages from individuals whose pictures may appear on the pushbuttons on the face of the toy telephone.

2. Description of the Prior Art

In the period from the invention of the telephone to the present numerous toy telephones have become available to the consumer. All strove to emulate the real telephone with varying degrees of success.

One of the objectives of some toy telephone designers was to use the toy telephone as an educational device to help show a child that a real person's voice may be transmitted electronically from one telephone to another. This can be a difficult concept for a child to grasp: the other party is not generally visible, and the other party's voice generally sounds different when transmitted via telephone than it would sound in person. Hence the small child may not recognize the voice of even a close friend or relative when listening to that voice transmitted via telephone.

U.S. Pat. No. 4,713,035 was granted Thom for a rotary dial toy telephone that made one sound when the dial was rotated and a second sound when the dial was depressed axially. While this toy's exterior aspect approximated that of a real telephone, it didn't help educate the child in telephonically transmitted voice recognition. In addition, this toy may have confused children in that the toy made a noise when its rotary dial was depressed axially, which would not have been the case with a real telephone.

Sielaff obtained U.S. Pat. No. 4,505,358 for a pair of toy telephones joined by a pair of flexible speaking tubes, each of which was connected to the mouth piece of one toy telephone at one end and the earpiece of the second telephone at the other end. While this device allows two individuals to communicate via the voice tubes, the individuals talking with each other would generally be in plain sight of each other due to the limited length that it would be practical to make the speaking tubes. In addition the sound transmitted acoustically through the speaking tubes would differ from the electronically transmitted sound of a telephone.

T. Wolf was issued U.S. Pat. No. 3,422,566 for an elaborate arrangement in which a toy telephone could be placed in a given location atop a cabinet, which would close a circuit and cause the apparatus to produce a ringing sound. When the toy telephone was moved to a second location the ringing sound would cease and a recorded message issue from a speaker located in the cabinet. While an amusing toy, Wolf's invention did not teach the young child to recognize telephonically transmitted voices.

Another example of prior art toy telephones can be found in the form of U.S. Pat. No. 2,806,322 issued to S. Ford for a knockdown toy telephone. This toy was constructed of holed blocks assembled on vertical dowels, and was basically a three dimensional puzzle.

Finally, telephones exist currently available on the market which possess large enough pushbuttons with transparent covers to allow the placement of illustrations between the pushbuttons and the transparent covers.

SUMMARY OF THE INVENTION

Accordingly, it is an object of this invention to provide a toy telephone that is realistic in external appearance capable of recording a number of messages from different individuals.

It is a further object of this invention to allow the recording to take place by positioning the handset of a conventional telephone in the toy telephone's cradle and recording the sound issuing from the earpiece of the conventional telephone's handset. In this manner a message can be recorded from an individual calling the conventional telephone from a location remote to that of the invention.

It is still a further object of the invention to provide a toy telephone alternately capable of recording a message from a source located close to the toy telephone.

It is another object of this invention to provide a toy telephone whose keys are large enough and equipped with transparent covers to allow the placement of fotographs or other illustrations on the keys.

It is a further object of this invention to provide a toy telephone capable of storing recorded messages in a location assigned by the keys—more specifically, it is an object of this invention to provide a toy telephone capable of recording a message from an individual whose likeness appears on a given key, and to store that message in a location accessed via that key.

It is a further object of this invention to provide a toy telephone capable of playing back messages by actuating the appropriate key on the face of the toy telephone.

It is still a further object of this invention to provide a toy telephone capable of playing back recorded messages either through the earpiece of the toy telephone's handset, or both through the handset and a speaker located in the toy telephone.

BRIEF DESCRIPTION OF THE DRAWINGS

The invention, together with the other objects, features, aspects and advantages therof, will be more clearly understood from the following description considered in conjunction with the accompanying drawings.

Four sheets of drawings are provided, sheet one containing FIG. 1, sheet two containing FIG. 2, sheet three containing FIGS. 3, 4 and 5, and sheet four containing FIG. 6.

FIG. 3 is a rear view of the toy telephone recorder. We can observe the bushbutton covers 24 and the handset speaker 20.

FIG. 4 shows the bushbutton 2, illustration 26 and pushbutton cover 24, and shows the manner in which the three are assembled.

FIG. 5 is a cross section of the pushbutton cover 24/illustration 26/pushbutton 2 assembly, showing how tongue 25 and groove 3 hold the assembly together by means of a mechanical interference tongue-in-groove fit.

FIG. 6 is a block diagram showing how the internal components of the toy telephone recorder are connected.

COMPLETE DESCRIPTION OF THE PREFERRED EMBODIMENTS

Figure 1:
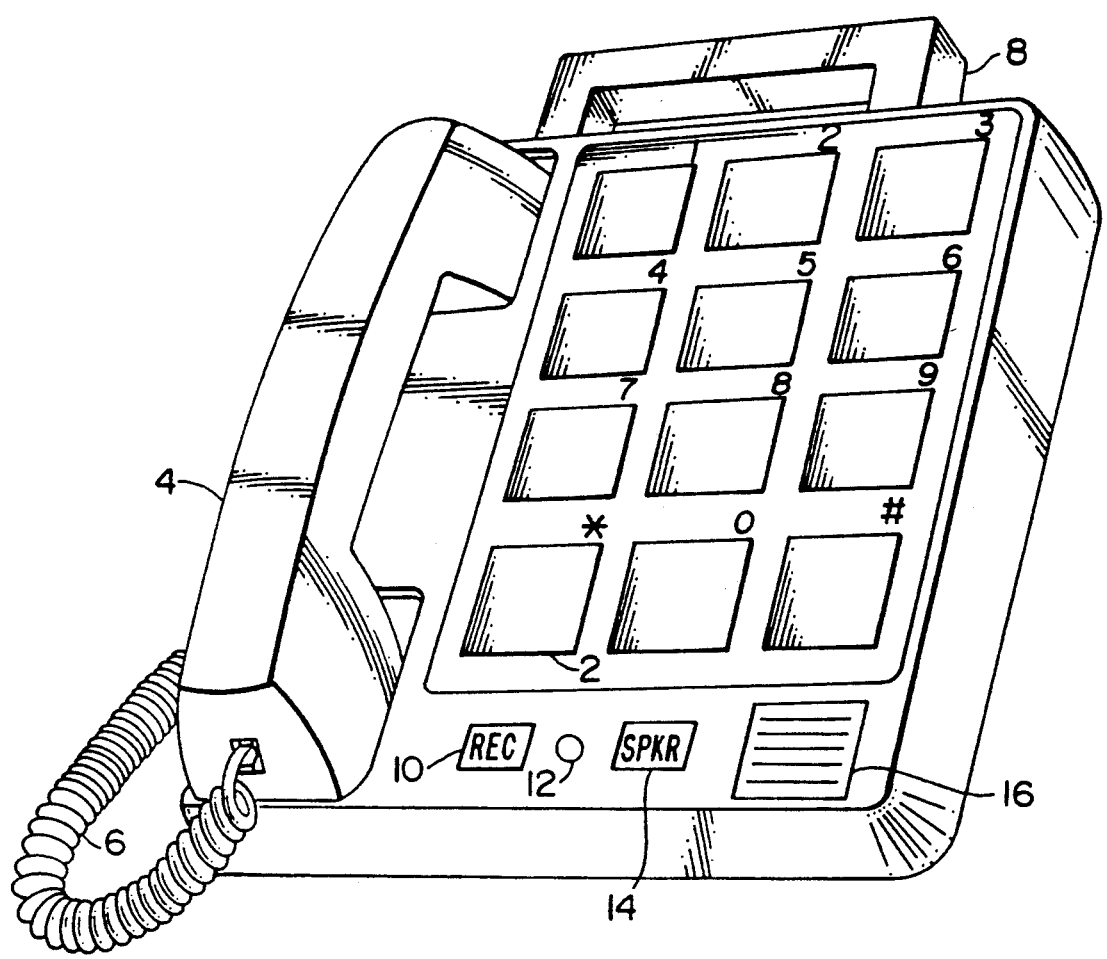
FIG. 1 is a front isometric view of the toy telephone recorder. The pushbuttons 2 are visible, as are record switch 10 and speaker switch 14.

Referring now to FIG. 1 we see a front isometric view of the toy telephone. The large pushbuttons 2 can be seen on the face of the toy telephone recorder, and we can also see handset 4 connected to the toy telephone recorder by means of connecting cord 6.

Handle 8 is located on the top of the toy telephone recorder to permit easy carrying by a child, and the handset 4 is held in the position depicted in FIG. 1 mechanically while the toy telephone recorder is being transported or stored in the vertical position. Record switch 10 permits recording to take place, and record light 12 illuminates when the toy telephone recorder is recording. Speaker switch 14 activates speaker 16 to allow individuals in the vicinity of the toy telephone recorder to hear messages being played back.

Figure 2:
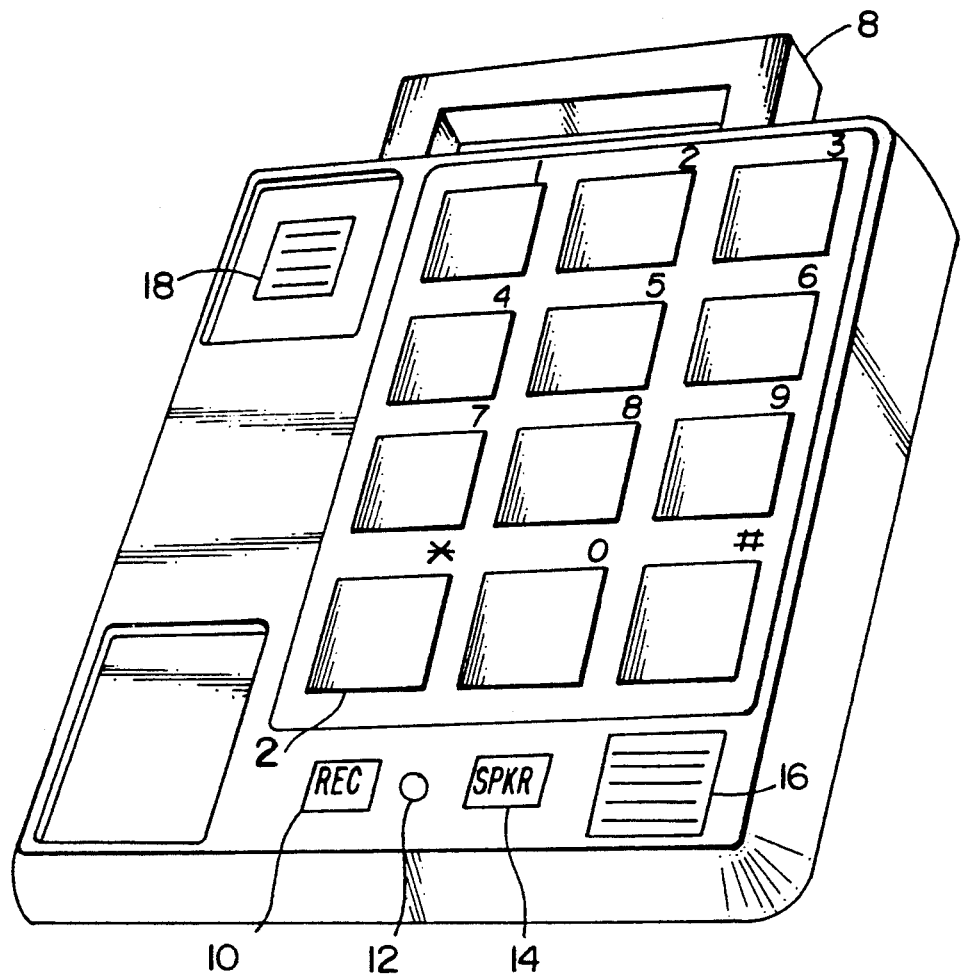
FIG. 2 is a front isometric view of the toy telephone recorder with the handset removed, allowing us to see the microphone 18 location.

FIG. 2 is the same as FIG. 1 except the handset 4 has been removed so we can see the location of microphone 18. Microphone 18 is used to record messages either from a conventional telephone handset placed on the toy telephone recorder in the same position as handset 4 in FIG. 1, or from an individual speaking directly into microphone 18. We can observe pushbuttons 2, handle 8, record switch 10, record light 12, speaker switch 14 and speaker 16.

FIG. 3 is a rear view of the toy telephone recorder. We can see the carrying handle 8, and handset speaker 20 in handset 4. Connecting cord receptacle 22 is visible, which accommodates one end of connecting cord 6. On the front Of the toy telephone recorder we can see pushbuttons 2 and transparent pushbutton covers 24.

FIG. 4 shows how the pushbutton covers 24 trap illustration 26 when pushbutton cover 24 is installed on pushbutton 2. The nature of the illustration 26 can vary . . . it can be a picture of an individual whose message is stored in the location accessed via the pushbutton in question, or the illustration 26 could be otherwise related to the contents of the storage location associated with that particular pushbutton. A screwdriver or other suitable tool may be inserted into pry slot 23 to facilitate the removal of pushbutton cover 24 to allow changing illustration 26.

FIG. 5 shows a pushbutton cover 24 installed on a pushbutton 2. Pushbutton cover 24 has tongues 25 which lock into pushbutton grooves 3. This tongue-in-groove arrangement holds pushbutton cover 24 in place, which keeps illustration 26 in the correct position.

FIG. 6 is a block diagram showing how the internal components of the toy telephone recorder are connected. A message stored in a given voice recordable microchip 28 is played back by depressing the pushbutton 2 connected to that voice recordable microchip 28. The voice recordable microchip output is amplified in amplifier 30, and is then sent to handset speaker 20 located in handset 4 via connecting cord 6. If desired, speaker 16 can be activated via speaker switch 14 so all individuals in the vicinity of the toy telephone recorder are able to hear the playback.

We can also see microphone 18, used to record messages in the voice recordable microchips 28. Recording is accomplished by simultaneously depressing record switch 10 and the pushbutton 2 connected to the voice recordable microchip 28 in which we want to store the message. Depressing the record switch 10 illuminates record light 12, indicating that the toy telephone recorder is in the record mode.

Operation: Inserting an Illustration

Use a screwdriver or other suitable tool to remove the pushbutton cover 24 by inserting the tool in pry slot 23 and then prying up. Remove the old illustration 26 and replace with the desired illustration 26. Install the pushbutton cover 24 by snapping the tongues 25 into grooves 3, simultaneously trapping the new illustration 26 in place.

Operation: Remote Recording

Establish telephonic communications with the party you wish to record on a conventional telephone. Place the handset of the conventional phone on the toy telephone recorder in the position occupied by handset 4 in FIG. 1. Depress the record switch 10 and the desired pushbutton 2, illuminating record light 12. When the available storage space is used up the record light 12 will extinguish and the toy telephone recorder is ready for playback.

Operation: Direct Recording

Remove handset 4 from the toy telephone, uncovering microphone 18. Depress the record switch 10 and the desired pushbutton 2, illuminating record indicator 12. Speak your message at the microphone 18 from a distance of approximately 2 feet. When the available storage space has been used, the record light 12 will extinguish. The toy telephone recorder is now ready for playback.

Operation: Playback

Depress the pushbutton 2 corresponding to the message you wish to playback. The message will be played, audible through the handset speaker 20. If it is desired to playback a message loudly enough for individuals in the vecinity of the toy telephone recorder to hear, depress speaker switch 14, which will activate speaker 16.

While a preferred embodiment of the invention has been illustrated herein, it is to be understood that changes and variations may be made by those skilled in the art without departing from the spirit and scope of the appending claims.

What is claimed is:

1. A toy telephone recorder comprising:
    memory means defining a plurality of message storage locations adapted to store verbal audio messages, a handset comprising microphone and speaker in communication with said memory means, storingly received at a handset receiving location on a casing containing said memory means, microphone means at said handset receiving location in communication with said memory means, a plurality of push-button assemblies capable of housing illustrations, each of said push-button assemblies being electrically connected to one of said plurality of message storage locations, and each said assembly including means for receiving a removable illustration, means for recording verbal audio messages in said message storage locations, in response to actuation of a push-button assembly, means for electrically connecting said message storage locations to said recording means, audio output means for playing back recorded audio messages in response to actuation of a push-button assembly, and said memory means, said plurality of push-button assemblies, and recording means, said electrical connecting means, and said audio output means comprising a stand alone self-contained toy telephone recorder.

2. The toy telephone recorder of claim 1 wherein said pushbutton assemblies comprise:

a pushbutton, and a transparent cover capable of locking onto said pushbutton by means of a mechanical interference tongue-in-groove fit.

3. A toy telephone recorder comprising:

a plurality of push-button assemblies capable of housing illustrations, each of said push-button assemblies being electrically connected to one of a plurality of message storage locations, means for recording audio messages in said message storage locations, a handset comprising microphone and speaker in communication with said memory means, storingly received at a handset receiving location on a casing containing said memory storage locations, means for playing back said audio messages, and said means for recording and said means for playing back comprising a microphone in said casing of said telephone recorder appropriately located so as to receive sounds emitting from a conventional telephone handset placed in the position that said handset of said toy telephone recorder would normally be located, a plurality of voice-recordable microchips providing said message storage locations, said plurality of push-button assemblies each electrically connected with one of said plurality of voice recordable microchips so that said push-button assemblies can initiate one of recording and playback, said plurality of push-button assemblies, said means for recording audio messages, and said means for playing back comprising a stand alone self-contained toy telephone recorder.

4. The toy telephone recorder of claim 3 wherein said audio messages are played back through a speaker in the earpiece of said toy telephone recorder's handset.

5. The toy telephone recorder of claim 4 wherein said messages may be also played back via a speaker housed in the body of said toy telephone recorder.

6. The toy telephone recorder of claim 5 further comprising:

a record light which is illuminated while said toy telephone recorder is recording, and a switch capable of activating and de-activating the speaker housed in the body of said toy telephone recorder.

7. A toy telephone recorder comprising:

memory means comprising a plurality of message storage areas;

means for picking up and converting sound waves into an audio signal;

means for recording an audio signal produced by said picking up and converging means in said memory means;

means for playing back an audio signal recorded by said recording means;

a handset comprising microphone and speaker in communication with said memory means, storingly received at a handset receiving location on a casing containing said memory means, microphone means at said handset receiving location in communication with said memory means, a plurality of push-button assemblies, each said push-button assembly being operatively associated with a predetermined message storage area of said memory means;

whereby an audio message may be recorded in a message storage area upon actuation of a corresponding push-button assembly and said picking up and converting means, and whereby a recorded audio message may be output through said playing back means upon actuation of a push-button assembly, said memory means, said picking up and converting means, said recording means, said playing back means, and said plurality of push-button assemblies comprising a stand alone self contained toy telephone recorder.

8. The toy telephone recorder according to claim 7, each said pushbutton assembly comprising means for housing a removable illustration and means for disassembling said pushbutton assembly to enable insertion and/or removal of an illustration.

9. Put toy telephone recorder according to claim 7, said means for picking up and converting soundwaves comprising a microphone positioned in a body of said toy telephone recorder.

10. The toy telephone recorder according to claim 8, wherein said microphone is positioned so as to receive sounds emanating from a conventional telephone handset placed in a position wherein a handset associated with said toy telephone recorder would normally be located.

11. The toy telephone recorder according to claim 7, said playing back means comprising a speaker in an earpiece of a handset of said toy telephone recorder.

12. The toy telephone recorder according to claim 10, said playing back means further comprising a speaker container in a body of said toy telephone recorder.

13. The toy telephone recorder of claim 7, each of said pushbutton assemblies comprising means for accessing a corresponding message storage area.

14. The toy telephone recorder according to claim 1, said audio output means comprising a first speaker positioned in an earpiece of a handset of said toy telephone recorder and a second speaker positioned in a body of said toy telephone recorder.

15. The toy telephone recorder according to claim 1, said means for recording and said audio output means comprising a plurality of voice-recordable microchips each said pushbutton assembly being electrically connected to one of said plurality of voice recordable microchips so that said pushbutton assemblies initiate recording and playback.

* * * * *